Nov. 26, 1946.   L. W. BONNELL ET AL   2,411,647
BOMB LOADING APPARATUS FOR AIRPLANES
Filed Aug. 25, 1944   5 Sheets-Sheet 4
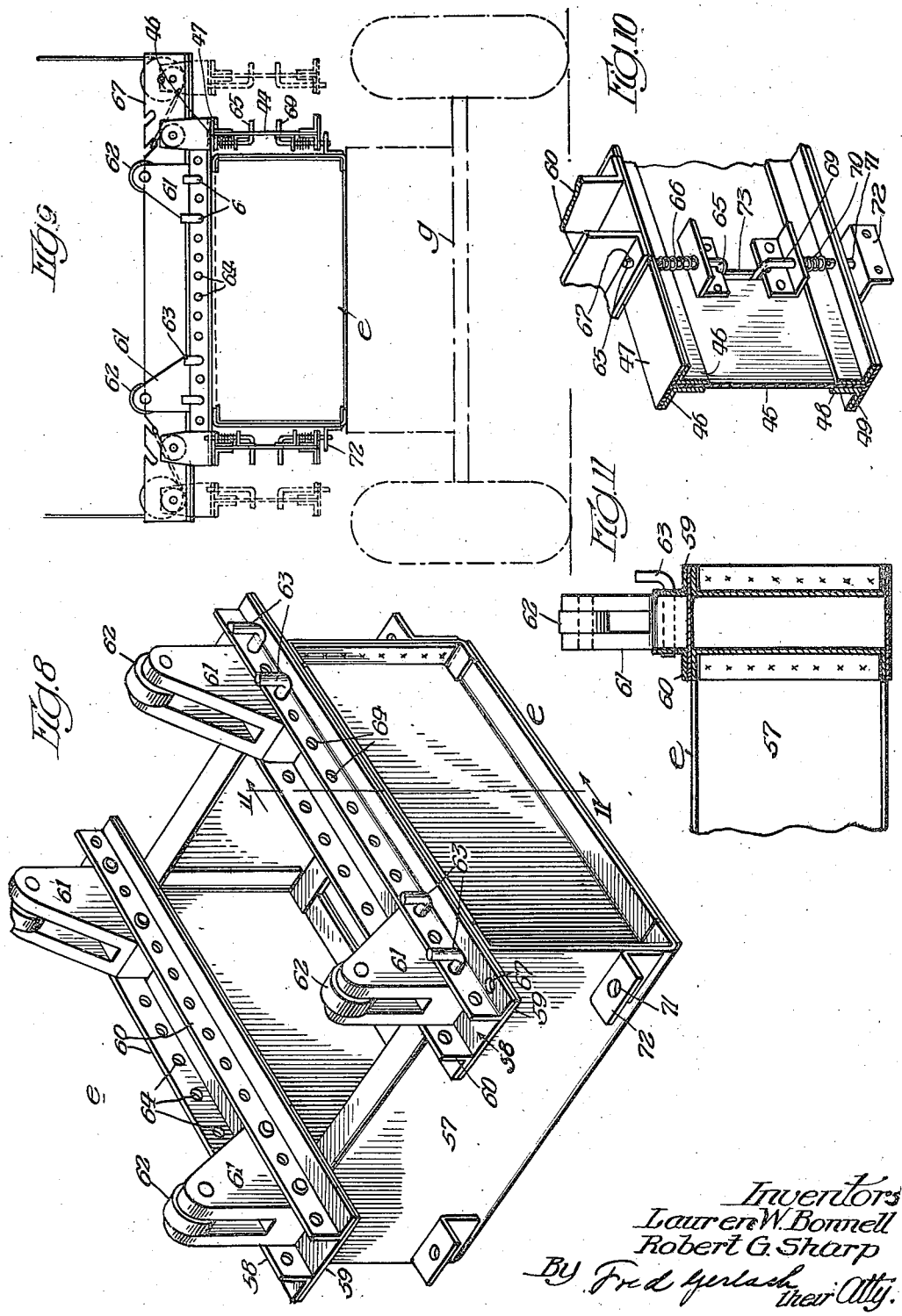
Inventors
Lauren W. Bonnell
Robert G. Sharp
By Fred Gerlach
their Atty.

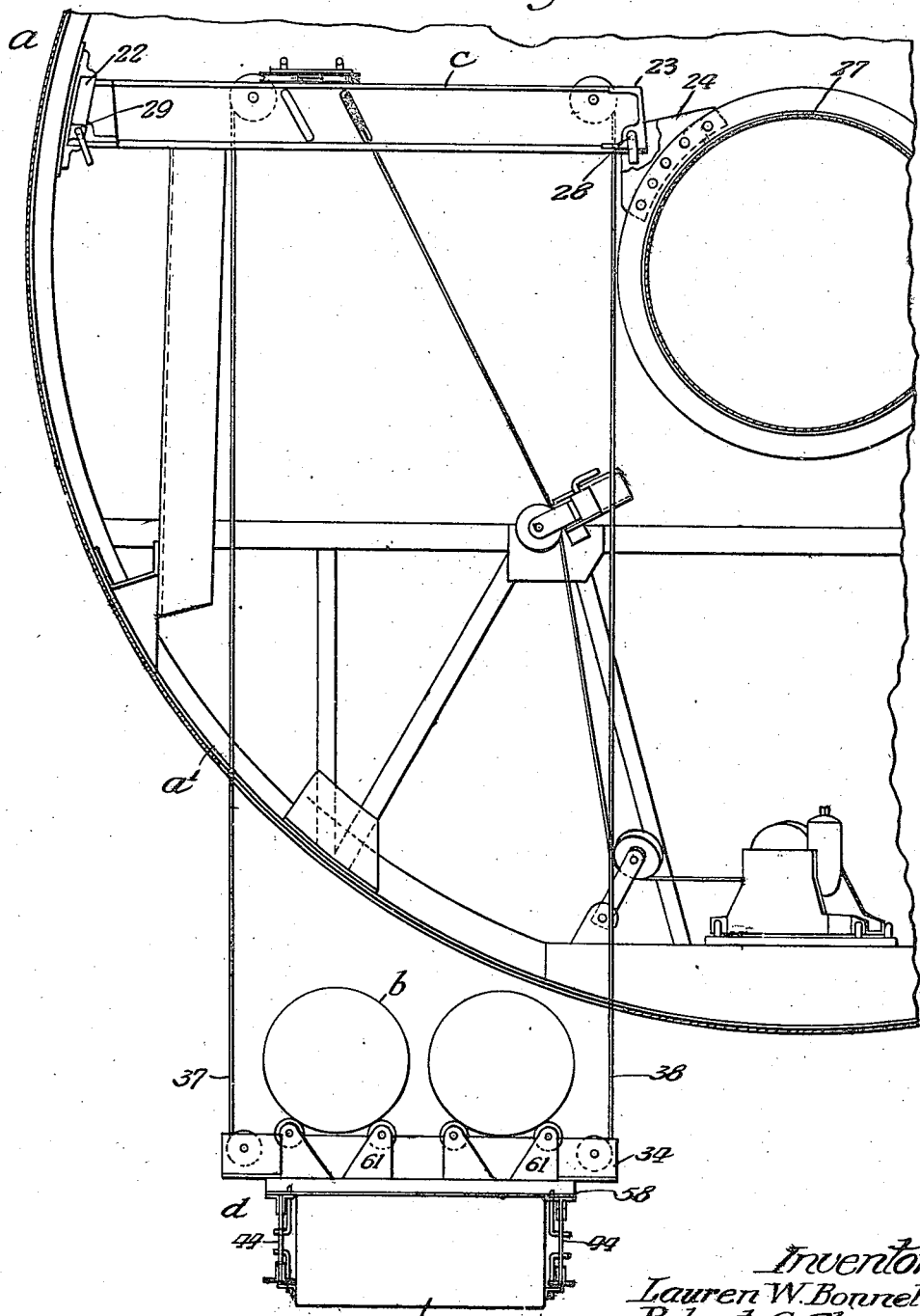

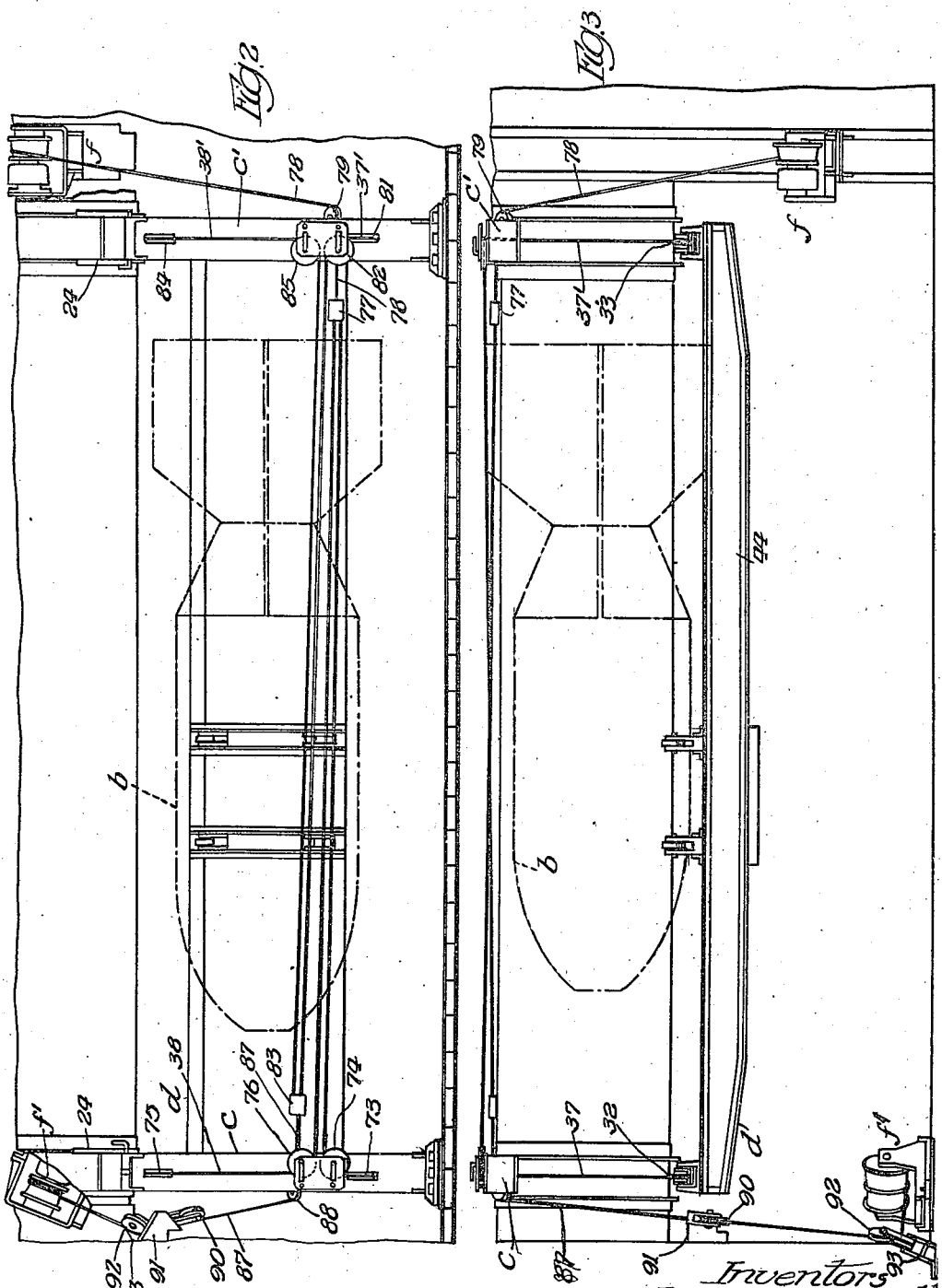

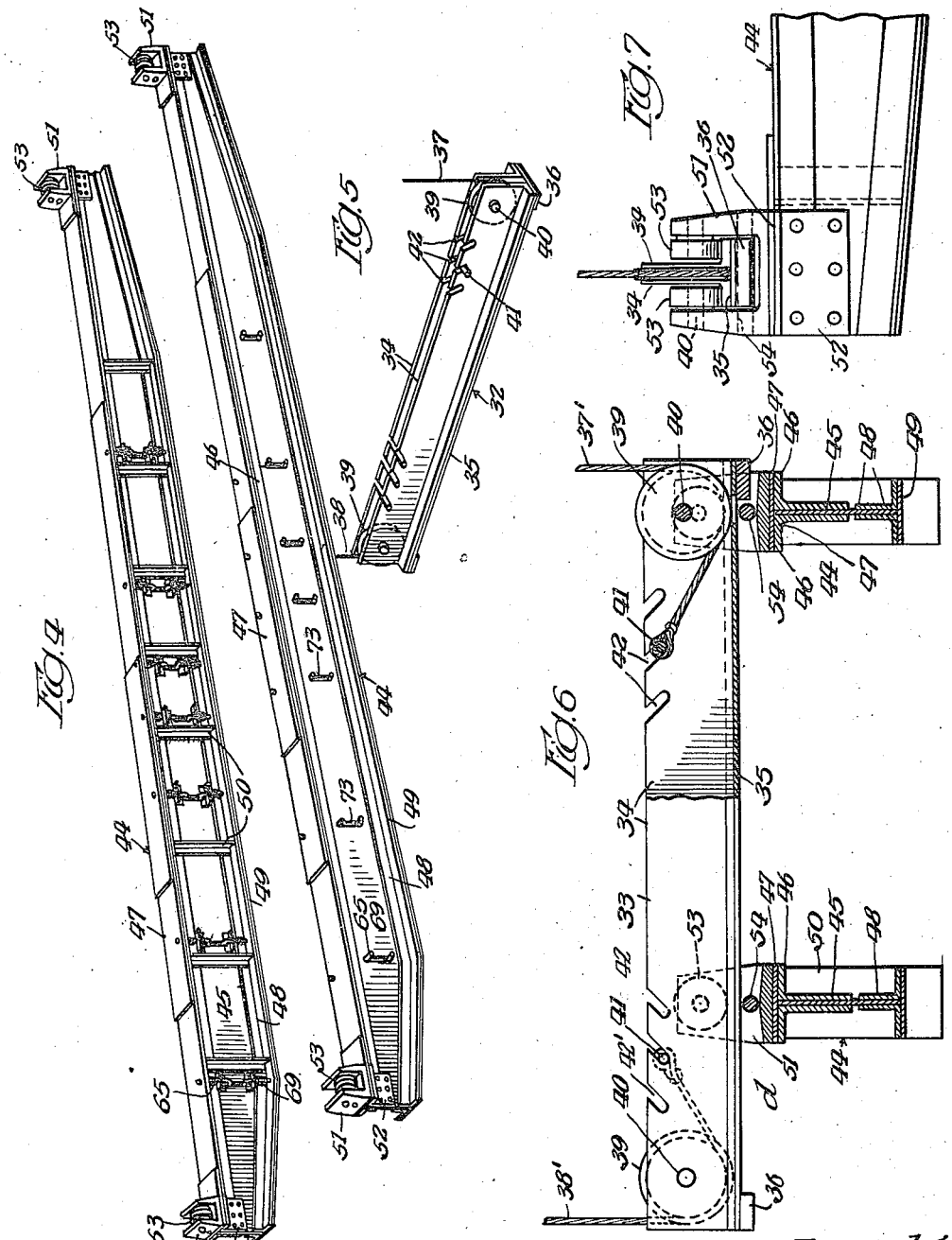

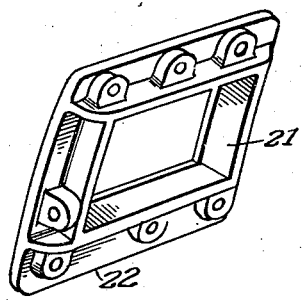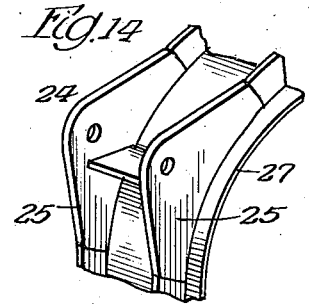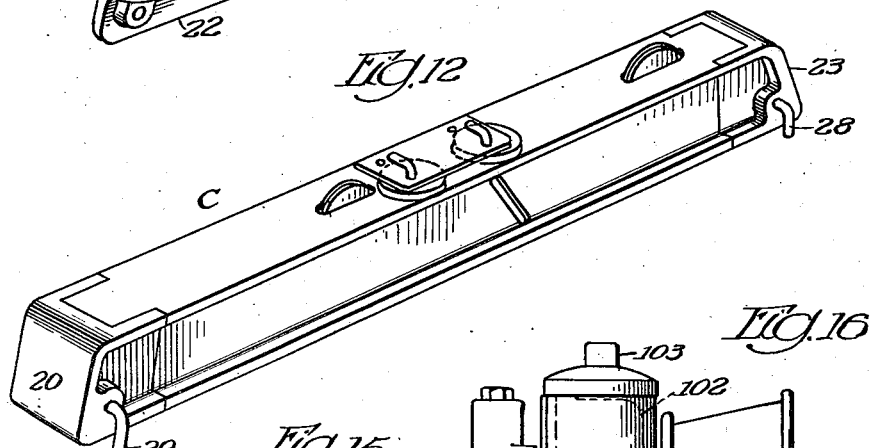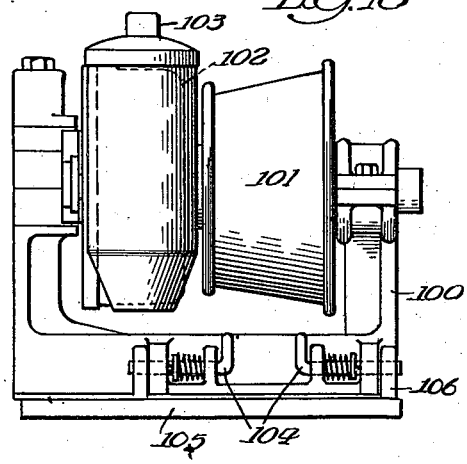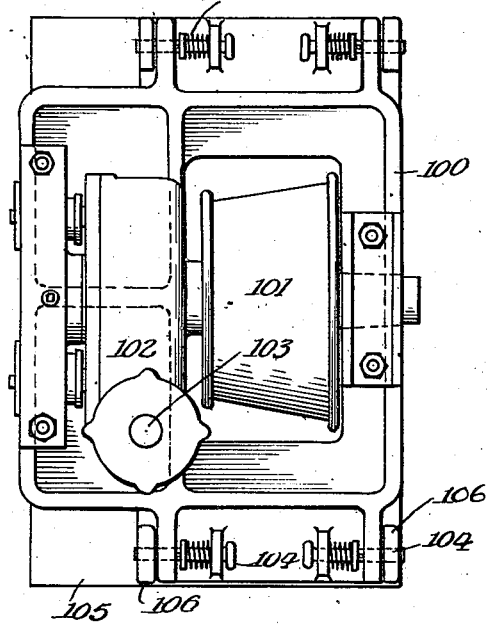

Patented Nov. 26, 1946

2,411,647

UNITED STATES PATENT OFFICE 2,411,647

BOMB LOADING APPARATUS FOR AIRPLANES

Lauren W. Bonnell, Fort Worth, Tex., and Robert Gordon Sharp, San Diego, Calif., assignors to Consolidated Vultee Aircraft Corporation, San Diego, Calif., a corporation of Delaware Application August 25, 1944, Serial No. 551,182

13 Claims. (Cl. 244—137)

The invention relates to bomb loading apparatus for airplanes.

One object of the invention is to provide bomb loading apparatus which is adapted to be temporarily installed in an airplane for use in loading bombs and removed therefrom after loading so that substantially none of the apparatus need be carried during flight.

Another object of the invention is to provide bomb loading apparatus which will load bombs from a dolly or truck onto which they are loaded at a place of storage or ammunition dump.

Another object of the invention is to provide hoisting mechanism for bombs which includes a system of cables arranged in the airplane for a maximum hoisting range.

A still further object of the invention is to provide a bomb loading apparatus which comprises bomb-carriers adapted for use in loading bombs of different sizes and singly or in multiple.

A still further object of the invention is to provide bomb hoisting apparatus for expeditiously loading bombs into airplanes and which is simple in construction and operation.

Other objects of the invention will appear from the detailed description.

The invention consists in the several novel features hereinafter set forth and more particularly defined by claims at the conclusion hereof.

In the drawings:

Fig. 1 is a partial transverse section through an airplane with the bomb loading apparatus operatively mounted in one side of the airplane, the lifting carriage being illustrated in its lowered position with a load of bombs shown in dotted lines.

Fig. 2 is a longitudinal section illustrating the lifting carriage in its raised position.

Fig. 3 is a plan.

Fig. 4 is a perspective of the longitudinal girders of the lifting carriage.

Fig. 5 is a perspective of one of the transverse beams of the lifting carriage.

Fig. 6 is a section through one end of the lifting carriage, parts being shown in elevation.

Fig. 7 is an end view of the parts shown in Fig. 5.

Fig. 8 is a perspective of the carrier for the bombs.

Fig. 9 is an end view of the bomb carrier secured in the lifting carriage, the girders of the carriage being shown in cross-section.

Fig. 10 is a sectional perspective of a portion of one of the girders of the lifting carriage and one of the locking devices for securing the bomb carrier on said carriage.

Fig. 11 is a section through one end of the bomb-carrier.

Fig. 12 is a perspective of one of the overhead supporting beams which is adapted to be removably secured in the airplane structure.

Figs. 13 and 14 are perspectives of the brackets for detachably supporting the ends of the overhead supporting beams in the airplane.

Fig. 15 is a plan of one of the mechanisms for operating the cables.

Fig. 16 is a side elevation of said cable operating mechanism.

The invention is exemplified in an airplane provided with a bomb bay $a$ and an opening $a'$ through which the bombs are loaded into and discharged from the airplane and which is normally closed by a suitable bomb bay door (not shown) as well understood in the art. The bomb $b$ is usually equipped with one or more attaching lugs which are releasable by bomb shackles which may be of any suitable known construction, and are therefore not illustrated.

The bomb loading apparatus comprises, generally, a pair of transverse supporting beams $c$, $c'$ for operatively supporting the hoisting mechanism, and are preferably removably secured in the airplane adjacent the ends of the bomb bay, for removal after the airplane has been loaded; a lifting carriage, generally designated $d$, which comprises longitudinally extending girders and transverse lifting beams at the ends of the girders and on which the girders are transversely movable for moving bombs carried by the girders transversely and for supporting engagement with the bomb-carrier; a cable-system with suspension and guide means mounted on and removable with the supporting beams, for raising the carriage into unloading positions in the bomb bay of the airplane and for lowering it through the opening $a'$; one or more bomb-carriers $e$ engageable by the girders of the lifting carriage with which the girders are engageable; and mechanism for operating the cable-system.

Each of the supporting beams $c$, $c'$ is structurally formed of plates and bars welded together and is provided at one end with a shoe 20 which is removably supported in a socket 21 formed in a bracket 22 which is rigidly secured by bolts to an available part of the airplane structure, and at its other end with a shoe 23 which is removably supported in a bracket 24 which is provided with side flanges 25 and is rigidly secured to an available part of the airplane structure, such, for example, as the band around a communication tube 27. The flanges 25 and shoe 23 are provided with holes for a removable pin 28 which is adapted to lock the inner end of a supporting beam in the bracket 24. Each shoe 20 and bracket 22 are provided with holes for removable pins 29 which are adapted to extend through said holes for removably locking the outer end of the beam to the airplane structure. Each of the beams c, c′ carries sheaves or pulleys for a system of cables for raising and lowering the lifting carriage as hereinafter described.

The lifting carriage comprises a pair of transverse end-beams 32 and 33. Each of the beams 32, 33 is formed of a pair of angle bars 34, the vertical flanges of which are spaced apart, a plate 35 to which the horizontal flanges of said bars are secured, as by welding, and blocks 36 secured, as by welding, to the underside of plate 35 adjacent the ends of the plate, respectively. Beam 32 is suspended from a pair of cables 37 and 38 each of which extends around a sheave 39 which is confined between the vertical flanges of the angle bars 34 and is connected to said beam by a shaft 40. Each of the cables 37, 38 extends around the outer side and under a sheave 39 and has its ends secured to a cross-pin 41 which is adapted to be placed into any of a series of slots 42 in the vertical flanges of angle bar 34 for taking up the cables. The beam 33 at the other end of the carriage is suspended from a pair of cables 37′, 38′, which are similarly connected to the beam 33. The cross beams 32 and 33 are spaced apart longitudinally of the airplane a sufficient distance for receiving the bomb-carriers between them.

The lifting carriage also comprises a pair of longitudinal girders 44 which are supported on the end-beams 32, 33. These girders form a longitudinal connection between the end-beams and are supported on said beams for transverse movement which permits the girders to be spread apart for lowering them past the bomb-carriers and for moving them together to bring them into supporting relation with the bomb-carriers. The girders 44 are independently movable transversely on the end-beams to permit them to be positioned transversely equidistantly from center or offcenter on the end-beams and correspondingly supporting the bomb-carriers. The girders are adapted to be locked to the bomb-carriers which extend between said girders, as hereinafter described, and when locked thereto the girders are conjointly movable transversely for moving the carrier or carriers and the bombs thereon transversely.

Each girder 44 is built up of a vertical plate 45, upper angle-bars 46, top plates 47, lower angle bars 48, bottom plates 49, and vertical angle bars 50, all rigidly secured together to form a rigid structure. A forked bracket 51 is fixedly secured to the top end of each girder 44 and has mounted therein a pair of inwardly facing rollers 53 which are adapted to travel on the horizontal flanges of angle bars 34 of the end beams 32, 33 at the outer sides of the vertical flanges of said bars for the purposes before stated. Pins 54 which extend through the brackets 51 are adapted to engage blocks 36 to prevent the girders from being rolled off the end-beams. This exemplifies a lifting carriage which comprises transverse end-beams and longitudinal girders which are supported on said beams and which are adapted to be spread apart and moved together while the end-beams remain suspended on the cables 37, 38, and 37′ and 38′.

The girders 44 of the lifting carriage are engageable with one or more of the bomb-carriers e. Each carrier comprises a box-like structure having its sides and ends formed of flanged plates, all rigidly secured together, as by welding, and forming a base 57; a pair of transverse channel bars 58 extending over and fixed on the top of base 57 and having ends projecting transversely from the sides of the base. Each bar 58 is preferably formed of a plate 59, and angle bars 60 secured together. Chocks 61 are slidably adjustable in the channel bars 58 and provided with rollers 62 for engaging a bomb. A pair of chocks in each of the bars 58 form a cradle for supporting a bomb. Angle bars 60 are provided with a series of holes 64 for receiving pins 63 which are adapted to extend through holes in the chocks 61 for securing the chocks in different transverse positions on the carrier. These pins 63 and holes 64 make it possible to secure two pairs of chocks in positions for holding two small bombs transversely of each other on the carrier, or for securing a single pair of chocks in properly spaced relation for holding bombs of larger sizes.

The outer ends of the bars 58 project beyond the sides of the bottom faces of the carrier and these projecting portions are engageable by the tops of the longitudinal girders 44, for lifting. Each of the longitudinal girders 44 has slidably mounted therein a series of latch-devices for locking the carriers to the girders, at different points longitudinally of the girders. Each of these series of latch-devices comprises a bolt 65 which is slidably mounted in and at the inner side of the girder and loaded by a spring 66 to hold the upper end of the bolt in a hole 67 in one of the channel bars 58 of the carrier and a lower bolt 69 which is slidably mounted in the girder, and loaded by a spring 70 to hold the lower end of the bolt in a hole 71 in an angle plate 72 fixed to one side and adjacent to one of the ends of the base 57 of the carrier. The out-turned ends of bolts 65 and 69 extend through slots 73 in the girder and form handles for operating the bolts from the outer sides of the girders.

Each carrier e is locked at both of its opposite sides to one of the girders 44 so that when a carrier is thus locked the girders will be connected together for conjoint transverse movement of the lifting carriage on the end-beams and moving the bomb transversely. The series of latch devices along each of the girders permits a single carrier to be secured adjacent the longitudinal center of the carriage or a pair of carriers to be secured longitudinally of one another to the girders. The latch devices lock the carriers against longitudinal movement along the girders. When the latch devices are disengaged from the carriers, the girders can be spread apart to permit them to be lowered at the outer side of the carrier or carriers into position to be moved transversely under the projecting ends of the channel bars 58 on the carriers so that the latter can be lifted and supported by the girders.

The carriers with the bombs thereon are usually transported on a dolly or truck g indicated by dotted lines in Fig. 9. The dolly is loaded with the carriers and the bombs at the place where the bombs are stored, and then transported to a position under the lifting carriage so that the carrier can pass between the girders as the latter are lowered. The girders are then moved together for engagement with the projecting ends of the channel bars 58.

The hoisting mechanism for the lifting carriage is of the suspension type and comprises cables or flexible elements 37 and 38 on the lower ends of which the ends of the transverse beam 32 are suspended, and cables 37' and 38' on which the transverse beam 33 at the opposite end of the lifting carriage is similarly suspended. The upper portion of cable 37 passes around a vertical sheave 73 and thence around a horizontal sheave 74, both of which sheaves are mounted on and carried by the supporting beam c. The cable 38 passes from one of the sheaves 39 on transverse beam 32 around a vertical sheave 75 and thence around a horizontal sheave 76 which sheaves are also mounted on the supporting beam c. Cables 37 and 38 extend from sheaves 74 and 76, respectively, longitudinally of the airplane and are connected together by a coupling 77 which, when the lifting carriage is raised, is positioned adjacent the supporting beam c'. A cable section 78 has one of its ends fixed to the coupling 77, passes around an inclined sheave 79, and thence to a cable operating mechanism f whereby the cables 37 and 38 for suspending the lifting beam 32 can be simultaneously operated to raise or lower said beam. The cable 37' which is connected to one of the ends of the transverse lifting beam 33 passes around a vertical sheave 81, thence around a horizontal sheave 82, both of which are carried by the supporting beam c', and thence to a coupling 83 which, when the lifting carriage is raised, is positioned near the supporting beam c. The lifting cable 38' passes around a vertical sheave 84, thence around a horizontal sheave 85, both of which are carried by the supporting beam c' and thence to a coupling 83. A cable-section 87 has one of its ends fixed to the coupling 83, passes around an inclined sheave 88 which is carried by the supporting beam c, and thence around a sheave 90 carried by a bracket 91 which is detachably mounted on the airplane structure, and thence around a sheave 92 which is carried by a bracket 93 which is detachably mounted by the airplane structure to a mechanism f' by which the cables 37' and 38' may be operated to raise or lower the lifting beams 33 at one end of the lifting carriage.

Each cable-operating mechanism f, f' is detachably mounted on the airplane structure for removal with the hoisting apparatus, and comprises a frame 100, a drum 101 journaled in the frame, and speed reducing gearing 102 through which the drum is driven and which is also supported in the frame 100. This gearing comprises an input shaft 103 which is adapted for connection to a crank or an electric motor for operating the drum 101 to wind and unwind the cable connected thereto. The frame 100 is provided with a series of four spring-pressed bolts 104 for detachably locking said frame to lugs 106 on a plate 105 which is fixed to a part of the airplane structure. When the bolts 104 are unlocked from bracket 105, the cable winding mechanism can be removed from the airplane. This exemplifies a cable operating mechanism which can be quickly secured to the airplane structure for the operation of the hoisting mechanism and removed after the airplane has been loaded with bombs.

The operation of the apparatus will be as follows: when the airplane is to be loaded with bombs, the ends of the beams c, c' are placed in the brackets 22 and 26 and secured therein by pins 28 and 29. The cable operating mechanisms f and f' are secured to brackets 105 in the airplane longitudinally of the ends of the lifting carriage and adjacent the transverse center of the airplane structure. During the installation of the supporting beams and the cable operating mechanisms, the lifting carriage may rest on the ground or on a suitable support and the cable connections may remain connected to the beams and the lifting carriage. The winding mechanisms are then operated to operate the cable-system to lift the ends of the carriage to an elevation which will permit the dolly g with one or more carriers e loaded with bombs, to be wheeled under the lifting carriage. The girders 44 are then spread apart to the ends of the transverse lifting beams 32, 33. The dolly g is wheeled under the lifting carriage and spotted longitudinally according to the position it is desired to lift the bombs. The winding drums are then operated to lower the lifting carriage so that the girders 44 will be positioned at the sides of the carrier-base 57 on the dolly. The girders 44 are then moved toward each other until they underlie the projecting ends of the bars 58 and overlie the plates 72 on the carriers e. The latching bolts 66 and 69 are then engaged with the bars 58 and plate 72, respectively. The carrier will then be locked against longitudinal movement relatively to the girders 44 and the girders will be connected transversely by the carrier or carriers in readiness for a lifting operation. The winding mechanisms are then operated to raise the lifting carriage with the loaded cradle or cradles locked to the girders 44 into the bomb bay where the bombs will be on a level with shackles on the bomb-rack. The girders 44 can then be moved transversely to bring the bombs into position to be coupled to the shackles on the bomb-racks. When the lifting carriage has been raised into the bomb bay, the girders 44 with the carriers and bombs can be moved transversely to the racks. These operations may be continued until the airplane has been fully loaded with bombs. After the airplane has been loaded, the cable operating mechanisms are operated to lower the lifting carriage where it will rest on the ground or other suitable support. The supporting beams c, c' and the cable operating mechanisms f, f' can then be detached and removed from the airplane through the bomb bay opening so that substantially all of the bomb loading apparatus will be removed from the airplane preparatory to flight. When preferred, the couplings 77, 83 may be disconnected to facilitate the removal of the supporting beams c, c' from the airplane. The suspension and guide sheaves for the cable-system, except those necessarily mounted on the airplane structure, are conveniently removable with the beams c, c'.

When, for example, 1000 or 2000 pound bombs are to be loaded, a single bomb is supported on one carrier e and secured at the longitudinal center of the girders, as illustrated in Figs. 2 and 3. When, for example, 500 pound bombs are to be loaded, two carriers, each loaded with a single bomb, are disposed longitudinally of each other, and secured on the girders. Four 300 pound bombs can be simultaneously loaded by the use of two sets of chocks transversely of one another in one carrier, as illustrated in Fig. 1, and two carriers are locked to the girders 44 longitudinally of each other. In this manner the loading apparatus is adapted for singly lifting large bombs and simultaneously loading smaller bombs in multiple.

The loading apparatus is illustrated and described as used for loading bombs into racks at one side of the airplane. The same apparatus, by providing brackets 22, 24 at the other side of the airplane structure, can be interchangeably used for loading either side of the bomb bay. Where the airplane is equipped with bomb-racks longitudinally of one another of greater capacity than can be loaded by the lifting carriage, brackets for supporting the beams c, c' in different longitudinal positions may be provided in the airplane. The loading apparatus may be applied to airplanes of different contour. It is only necessary to provide supporting beams c, c' which fit the contour of the structure around the bomb-bay. The winding mechanisms are preferably mounted at the transverse center of the airplane so they can be used for operating cable-systems for lifting the carriage at either side of the bomb-bay. The term "cable" as used herein is to be understood as including any equivalent element, such as a chain or wire.

The invention exemplifies bomb loading apparatus which: is removable from the airplane after a loading operation; is adapted for loading large bombs singly and a plurality of smaller bombs; comprises a lifting carriage with girders which are movable transversely on the girders of the lifting carriage for receiving and engaging the bomb carriers and moving the raised bombs transversely; comprises carriers with adjustable chocks for retaining bombs of different sizes; is adapted to load from a dolly or truck to the airplane; is relatively simple in construction and by which airplanes can be expeditiously loaded with bombs.

The invention is not to be understood as restricted to the details set forth, since these may be modified within the scope of the appended claims without departing from the spirit and scope of the invention.

Having thus described the invention, what we claim as new and desire to secure by Letters Patent is:

1. The combination with a lifting carriage comprising transverse end-beams and longitudinally extending girders supported on the end-beams, and a cable-system for raising and lowering the carriage, of a bomb-carrier separable from the carriage and comprising a base adapted to pass between the girders, means adapted to be engaged by and for supporting the carrier on the girders, and chocks mounted on the base, for holding a bomb.

2. The combination with a lifting carriage comprising transverse end-beams and longitudinally extending girders supported for transverse movement on the end-beams, and a cable system for raising and lowering the carriage, of a bomb-carrier separable from the carriage and comprising a base adapted to pass between the girders, means adapted to be engaged by and for supporting the carrier on the girders, and chocks mounted on the base, for holding a bomb, and means for locking the carrier in different longitudinal positions to the girders.

3. The combination with a lifting carriage comprising transverse end-beams and longitudinally extending girders supported for transverse movement on the end beams, and a cable-system for raising and lowering the carriage, of a bomb-carrier separable from the carriage and comprising a base adapted to pass between the girders, means on the carrier adapted to be engaged by, and for supporting the carrier on the girders, and chocks mounted on the base, for holding a bomb, adjustably mounted on the base, and means for locking the girders to the carrier for conjoint transverse movement of the girders on the end-beams.

4. The combination with a lifting carriage comprising transverse end-beams and longitudinally extending girders supported for transverse movement on the end-beams, and a cable-system for raising and lowering the carriage, of a bomb carrier separable from the carrier and comprising a base adapted to pass between the girders, means on the carrier adapted to be engaged by, and for supporting the carrier on, the girders, and chocks mounted on the base, for holding a bomb, and means for locking the carrier in different longitudinal positions on the girders and for conjoint transverse movement of the girders.

5. The combination with a lifting carriage comprising transverse end-beams and longitudinally extending girders mounted for transverse movement on the end-beams and a cable-system for lifting the carriage, of a bomb-carrier separable from the carriage and comprising a base adapted to pass between the girders, cross bars fixedly secured to the base and provided with projecting ends engageable by the girders, and chocks for holding bombs adjustably mounted in said bars to hold bombs of different sizes.

6. The combination with a lifting carriage comprising transverse end-beams and longitudinally extending girders mounted for transverse movement on the end-beams and a cable-system for lifting the carriage, of a bomb carrier separable from the carriage and comprising a base adapted to pass between the girders, cross bars fixedly secured to the base and provided with projecting ends engageable by the girders, chocks for holding bombs adjustably mounted on said bars, and means for locking the base in different longitudinal positions on the girders.

7. In bomb-loading apparatus for an airplane, the combination with a rigid bomb-carrier, of a lifting carriage adapted to pass through an opening in the airplane-body and including transverse end-beams and longitudinal girders supported on the transverse beams, at least one of the girders being movably mounted on the transverse beams for permitting the carrier to pass between the girders and for movement of the girders into detachable supporting engagement with the carrier, a cable system connected to the ends of the transverse beams, for lifting the carriage, overhead suspension means for the cable-system supported on the body-structure of the airplane, and means for operating the cable-system to raise and lower the carriage.

8. In bomb-loading apparatus for an airplane, the combination with a rigid bomb-carrier, of a lifting carriage adapted to pass through an opening in the airplane body and including transverse end-beams and longitudinal girders supported on the transverse beams, each movably mounted on the transverse beams for permitting the carrier to pass between the girders and for movement of the girders into detachable supporting engagement with the carrier, a cable-system connected to the ends of the transverse beams for lifting the carriage, overhead suspension means for the cable system, supported on the body-structure of the airplane, and means for operating the cable-system to raise and lower the carriage.

9. In bomb-loading apparatus for an airplane, the combination with a rigid bomb-carrier, of a lifting carriage adapted to pass through an opening in the airplane-body and including transverse end-beams and longitudinal girders supported on the transverse beams, at least one of the girders being movably mounted on the transverse beams for permitting the carrier to pass between them and into detachable supporting engagement with the carrier, means for locking the carrier in different positions longitudinally of the girders, a cable-system connected to the ends of the transverse beams for lifting the carriage, overhead suspension means for the cable-system, supported on the body-structure of the airplane, and means for operating the cable-system to raise and lower the carriage.

10. In bomb-loading apparatus for an airplane, the combination with a rigid bomb-carrier, including a base, and supporting projections on the side of the base, of a lifting carriage adapted to pass through an opening in the airplane-body and including transverse end-beams and longitudinal girders supported on the transverse beams, of which at least one is movably mounted on the transverse beams to permit the carrier to pass between the girders and into detachable supporting engagement with the projections on the carrier, a cable-system connected to the ends of the transverse beams for lifting the carriage, overhead suspension means for the cable-system, supported on the body structure of the airplane, and means for operating the cable-system to raise and lower the carriage.

11. In bomb-loading apparatus for an airplane, the combination with a rigid bomb-carrier, of a lifting carriage adapted to pass through an opening in the airplane-body and including transverse end-beams and longitudinal girders, rollers adapted to travel on and for supporting the girders on the transverse beams to permit the carrier to pass between the girders and the girders to be moved into detachable supporting engagement with the carrier, a cable-system connected to the ends of the transverse beams for lifting the carriage, overhead suspension means for the cable-system, supported on the body-structure of the airplane, and means for operating the cable-system to raise and lower the carriage.

12. In bomb-loading apparatus for an airplane, the combination with a rigid bomb carrier, of a lifting carriage adapted to pass through an opening in the airplane-body and including transverse end-beams and longitudinal girders supported on the end-beams, detachably engageable with and for supporting the carrier, a cable-system connected to the ends of the transverse beams, for lifting the carriage, transverse overhead beams for supporting the cable-system, demountably supported on structural parts in the airplane-body, and means, demountably supported in the airplane-body and independently of the overhead beams, for operating the cable-system to raise and lower the carriage.

13. Bomb loading apparatus for an airplane, comprising: a lifting carriage adapted to pass through an opening into the airplane body; a rigid bomb carrier; the carriage being provided with means for supporting engagement with the bomb carrier; transverse supporting beams supported in the airplane body and above the ends of the carriage, respectively; said cable system comprising a pair of depending cable sections at each end of, and connected to, the ends of the carriage respectively, and pairs of cable sections extending longitudinally of the carriage, each pair of longitudinaly extending sections being coupled together between the supporting beams and connected to one pair of the depending sections; guide means between the depending sections and the longitudinal sections on each of the supporting beams; and operating means for the cable system connected to the coupled pairs of longitudinally extending cable sections, for operating each pair of the longitudinally extending cable sections to operate the depending sections.

LAUREN W. BONNELL.
ROBERT GORDON SHARP.